United States Patent
Lehane

[11] Patent Number: 5,637,029
[45] Date of Patent: Jun. 10, 1997

[54] METHOD AND APPARATUS FOR SHOT BLASTING MATERIALS

[76] Inventor: William B. Lehane, 56 Harwood Road, Cambridge, Ontario, Canada, N1S 4S7

[21] Appl. No.: 155,337

[22] Filed: Nov. 22, 1993

[51] Int. Cl.$^6$ .................................................. B24C 3/30
[52] U.S. Cl. .................... 451/39; 451/88; 451/40; 451/96; 451/86
[58] Field of Search .................... 451/39, 40, 85, 451/86, 88, 89, 96

[56] References Cited

U.S. PATENT DOCUMENTS

| | | | |
|---|---|---|---|
| 1,360,996 | 12/1920 | Anderson . | |
| 1,436,120 | 11/1922 | Townsend . | |
| 2,092,962 | 9/1937 | Fay et al. | 51/9 |
| 2,176,497 | 10/1939 | Hext | 51/9 |
| 2,223,366 | 12/1940 | Grove | 51/9 |
| 3,098,324 | 7/1963 | Straub | 51/9 |
| 3,103,084 | 9/1963 | Ashworth | 451/88 |
| 3,434,241 | 3/1969 | Greenberg et al. | 451/88 |
| 3,455,062 | 7/1969 | Eppler | 451/88 |
| 3,716,946 | 2/1973 | Graf | 451/88 |
| 3,921,336 | 11/1975 | Nishio et al. | 51/9 |
| 4,125,969 | 11/1978 | Easton | 51/320 |
| 4,250,024 | 2/1981 | Soares et al. | 451/88 |
| 4,449,331 | 5/1984 | MacMillan | 51/425 |
| 4,561,220 | 12/1985 | Carpenter et al. | 51/427 |
| 4,751,798 | 6/1988 | McDade | 51/432 |
| 4,800,063 | 1/1989 | Mierswa et al. | 451/88 |
| 4,802,312 | 2/1989 | Glaeser et al. | 51/321 |
| 4,815,241 | 3/1989 | Woodson | 51/439 |
| 4,907,379 | 3/1990 | MacMillan | 51/426 |
| 4,922,664 | 5/1990 | Spinks et al. | 51/321 |
| 4,959,930 | 10/1990 | Tsutsumi | 451/88 |
| 5,049,260 | 9/1991 | Spears | 209/2 |
| 5,054,249 | 10/1991 | Rankin | 51/436 |
| 5,056,274 | 10/1991 | Stern | 51/425 |

FOREIGN PATENT DOCUMENTS

| | | | |
|---|---|---|---|
| 6031275 | 9/1971 | Japan | 451/88 |

*Primary Examiner*—Robert A. Rose
*Attorney, Agent, or Firm*—Dale E. Schlosser; Arne I. Fors

[57] ABSTRACT

A method and apparatus for shot blast cleaning a workpiece. The method comprising the steps of applying a composite stream of a slurry consisting of carrier liquid and particulate abrasive material under high velocity to the workpiece in a blast cabinet, reclaiming spent slurry after undersized abrasive material have been removed, cleaning the carrier liquid for reuse and pumping the cleaned carrier liquid at the workpiece for washing and conditioning the workpiece or pumping the cleaned carrier liquid together with the reclaimed abrasive material as a composite stream at the workpiece. A nozzle which has a divider within it for separating the abrasive material and carrier liquid is used in combination with a slurry discharge head to discharge the abrasive material and carrier liquid in a substantially overlapping blast pattern.

10 Claims, 8 Drawing Sheets

METHOD AND APPARATUS FOR SHOT BLASTING MATERIALS

FIELD OF INVENTION

This invention relates to a method and apparatus for shot blast cleaning of workpieces and, more particularly, relates to a method and apparatus for concurrent cleaning and treatment of workpieces wherein spent slurry is reclaimed and recycled. The invention also relates to a novel blast nozzle for discharging a carrier liquid and an abrasive material towards a workpiece in an overlapping blast pattern.

BACKGROUND OF INVENTION

Shot blasting devices propel large volumes of abrasives at high velocity at workpieces in blast cabinets to effect cleaning of the workpieces for removing rust, paint and the like substances. De-greasing, etching, phosphating, rust-inhibiting and the like chemical treatments of workpieces normally must be effected by separate equipment through the spraying of a chemical solution at a workpiece in a wash cabinet. The shot blasting is affected in a separate cabinet.

U.S. Pat. No. 4,449,331 to MacMillan which issued May 22, 1984 discloses a shot blasting apparatus which includes a blast cabinet and an abrasive/contaminant separator and a conveyor. The workpiece is placed on a rotatable hanger within the blast cabinet to expose it to a cleaning stream of abrasive particles. In accordance with the method of this patent, the conveyor transmits spent abrasive and contaminants from the blast cabinet to a storage container. The conveyor is equipped so that it can handle both clean and spent abrasive simultaneously while keeping both separate. An air wash and sieves are utilized to separate contaminants from the abrasive.

U.S. Pat. No. 5,056,274 to Stem which issued Oct. 15, 1991 discloses the use of plastic granules within a liquid to form a slurry for propelling at a vehicle wheel for cleaning. Large particles that are loosened during the blasting process take part in the blasting along with the plastic granules.

U.S. Pat. No. 4,922,664 also discloses a liquid reclaim system whereby a liquid and abrasive mixture flows by gravity through a filtration system to separate the liquid and abrasive.

Discharge heads such as that disclosed in U.S. Pat. No. 4,907,379 to MacMillan which issued Mar. 13, 1990 propel abrasives at the workpiece. This patent discloses a one piece throwing wheel comprising a single side or back plate with angularly-spaced throwing blades for propelling shot at a workpiece.

U.S. Pat. No. 4,922,664 to Spinks et al which issued May 8, 1990 discloses a nozzle which contains a liquid supply means and an abrasive supply means. The liquid comes into contact with the abrasive within a chamber at an acute angle and propels the abrasive through an outlet bore to strike a workpiece. The optimum angle between the abrasive inlet and the liquid inlet is 30°. The inlet bore of the liquid is co-axial with the outlet bore of the liquid and abrasive combination.

Cleaning of a workpiece by shot blasting and chemical treatment of a cleaned workpiece normally is effected by separate steps, thereby requiring a variety of relatively complex and expensive process equipment arranged in sequence and involving a time delay between cleaning and treatment steps during which the cleaned workpiece may oxidize or otherwise become contaminated. Abrasive material such as steel shot is heavier than the liquid in a shot/liquid slurry, the shot normally is discharged separate from the liquid off of the blades of a centrifugal impelling apparatus, thus impinging the shot on a workpiece in a different area than the area of impingement of the liquid.

SUMMARY OF THE INVENTION

These disadvantages of the prior art may be overcome by a method of shot blast cleaning and reclaiming spent abrasive material comprising the steps of applying a composite stream of carrier liquid and particulate abrasive material under high velocity to said workpiece contained within a blast cabinet for cleaning said workpiece; transporting spent composite stream after cleaning to an abrasive material separator for separating said abrasive material from the carrier liquid and for removing undersized abrasive material to produce sized abrasive material; storing said sized abrasive material in a storage feed tank in communication with a shot mixing valve; cleaning said carrier liquid for reuse of said carrier liquid; pumping the cleaned carrier liquid for washing said workpiece, or pumping the cleaned carrier liquid under pressure through the shot mixing valve for inducing abrasive material into said carrier liquid and applying said carrier liquid and said abrasive material as separate streams concurrently onto the workpiece contained within said blast cabinet in a substantially overlapping blast pattern. The carrier liquid preferably is an aqueous solution for chemically treating the workpiece, thus allowing the workpiece to be cleaned and treated simultaneously.

The liquid-abrasive blast cleaner apparatus of the invention for concurrently impelling abrasive particles and a earlier liquid at high velocity at a target area comprises a substantially semi-cylindrical casing having an open side, an abrasive throwing wheel having a vaned impeller rotatably mounted within the casing for receiving an abrasive slurry at a relatively low velocity and discharging said slurry at a relatively high velocity out through said open side, a supply spout for supplying the abrasive slurry to the vaned impeller radially onto the impeller in proximity to the centre thereof, said supply spout having a first conduit feed section disposed substantially parallel to the impeller, a second conduit section perpendicular to the first conduit feed section and co-axial with the impeller terminating in a pair of spaced-apart radially directed outlets substantially perpendicular to the second conduit section whereby abrasive particles in the slurry are deflected by centrifugal force into an upstream outlet and the liquid deflected into a downstream outlet for discharge of the slurry onto the vaned impeller in separate streams whereby the abrasive particles and liquid streams are consolidated into an overlapping blast pattern.

The shot and liquid are discharged at the workpiece at slightly different angles. This compensates for the difference in mass between the shot and liquid and propels both to the same area of the workpiece.

BRIEF DESCRIPTION OF THE DRAWINGS

The method and apparatus of the invention will now be described with reference to the accompanying drawings, in which.

DETAILED DESCRIPTION OF THE INVENTION

Figure 1:
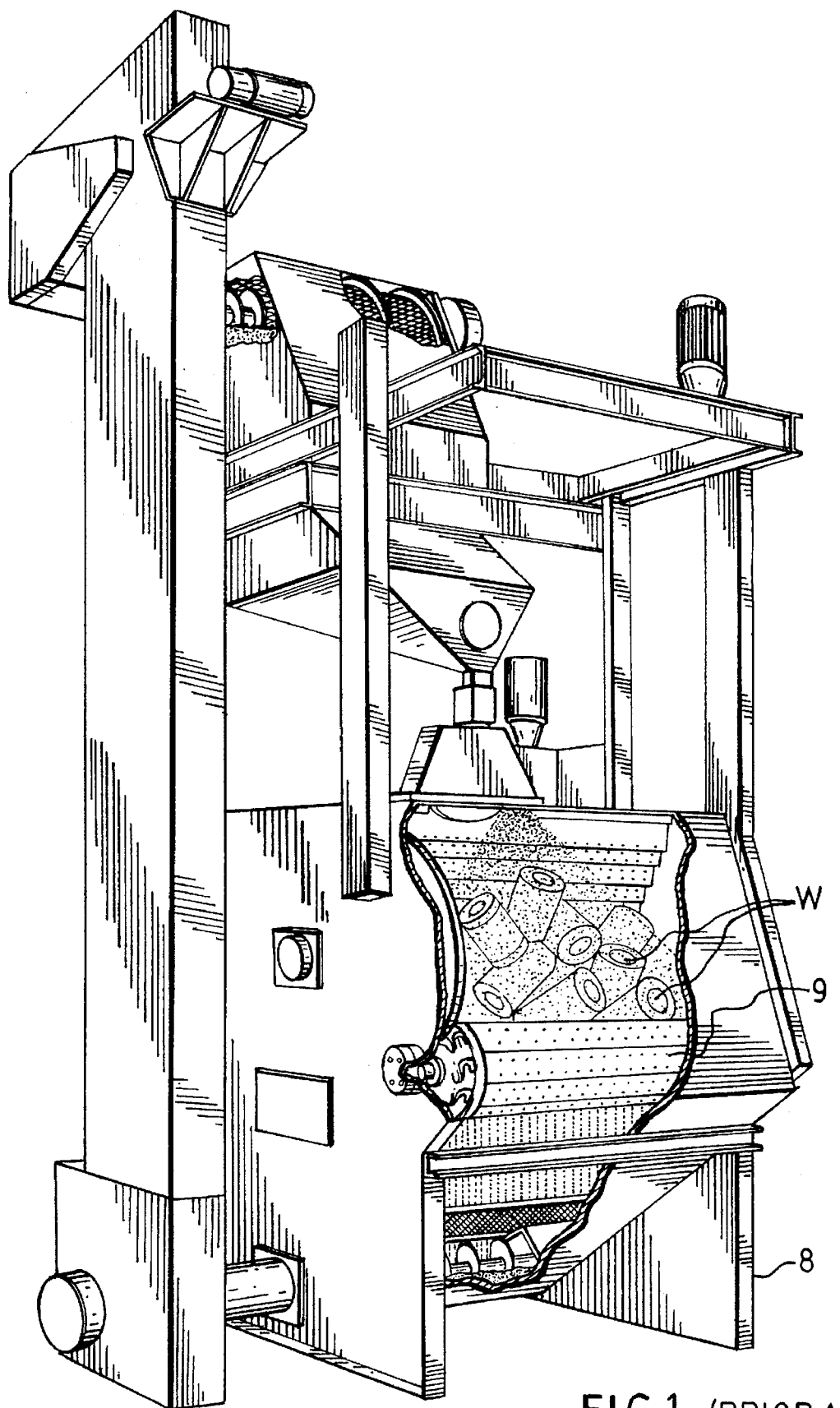
FIG. 1 is a perspective view of a prior art blast cabinet, partially cut away.

Referring to FIG. 1, a prior art blast cabinet 8 is shown whereby workpieces W are tumbled within blast cabinet 8 on a continuous belt 9. The blast cabinet 8 allows for shot blasting only; workpieces W must be transported to a wash cabinet via conveyor means (not shown) or similar transportation means for washing, decreasing, etc. Prior art blast cabinets enable workpieces to be treated individually or in groups. Workpieces may be tumbled, mounted on tables, hung on a hook and rotated in a stationary location within the cabinet, or continuously fed through the blast area of the cabinet.

Figure 2:
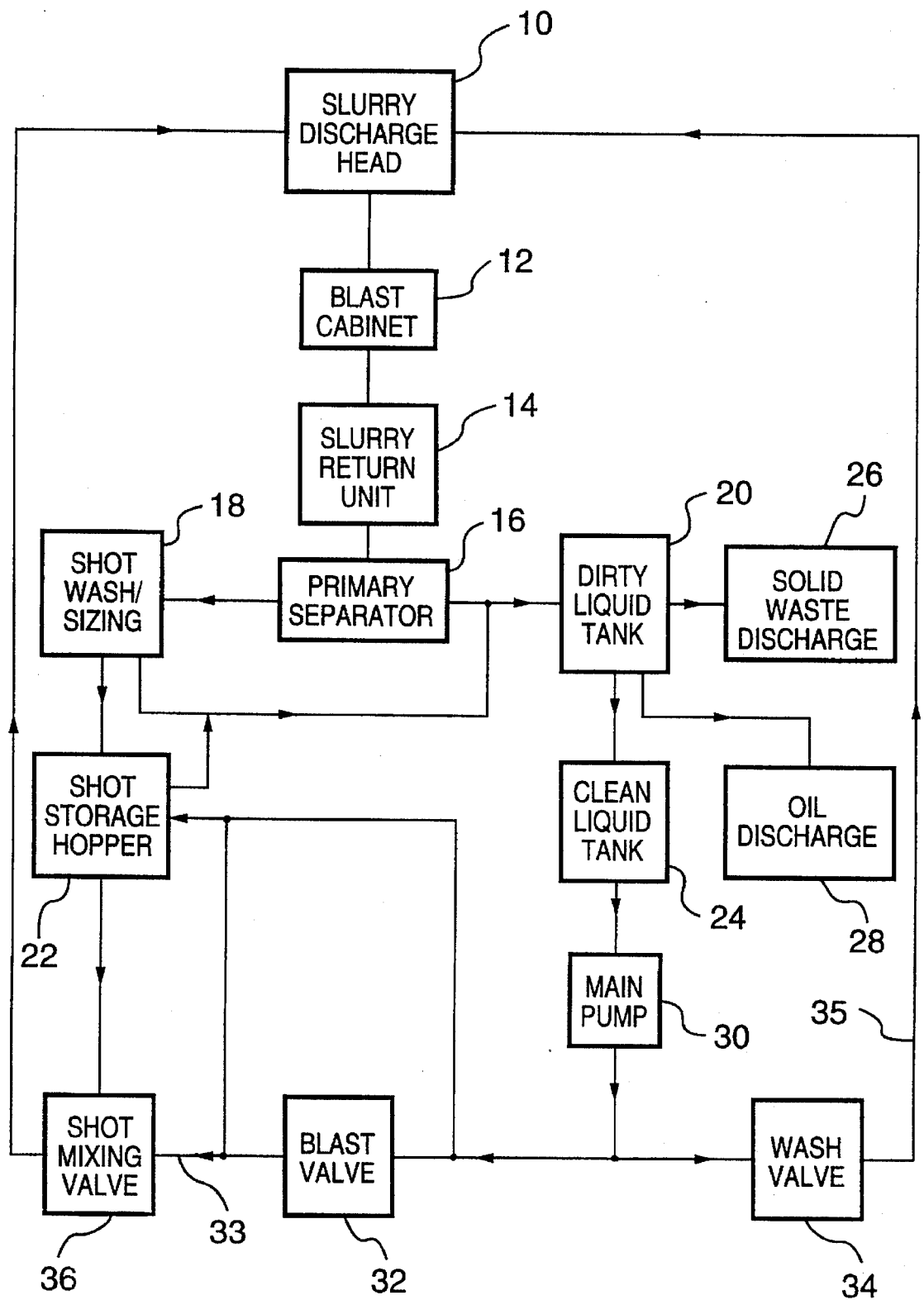
FIG. 2 is a flow sheet of the method of the present invention.
Figure 3:
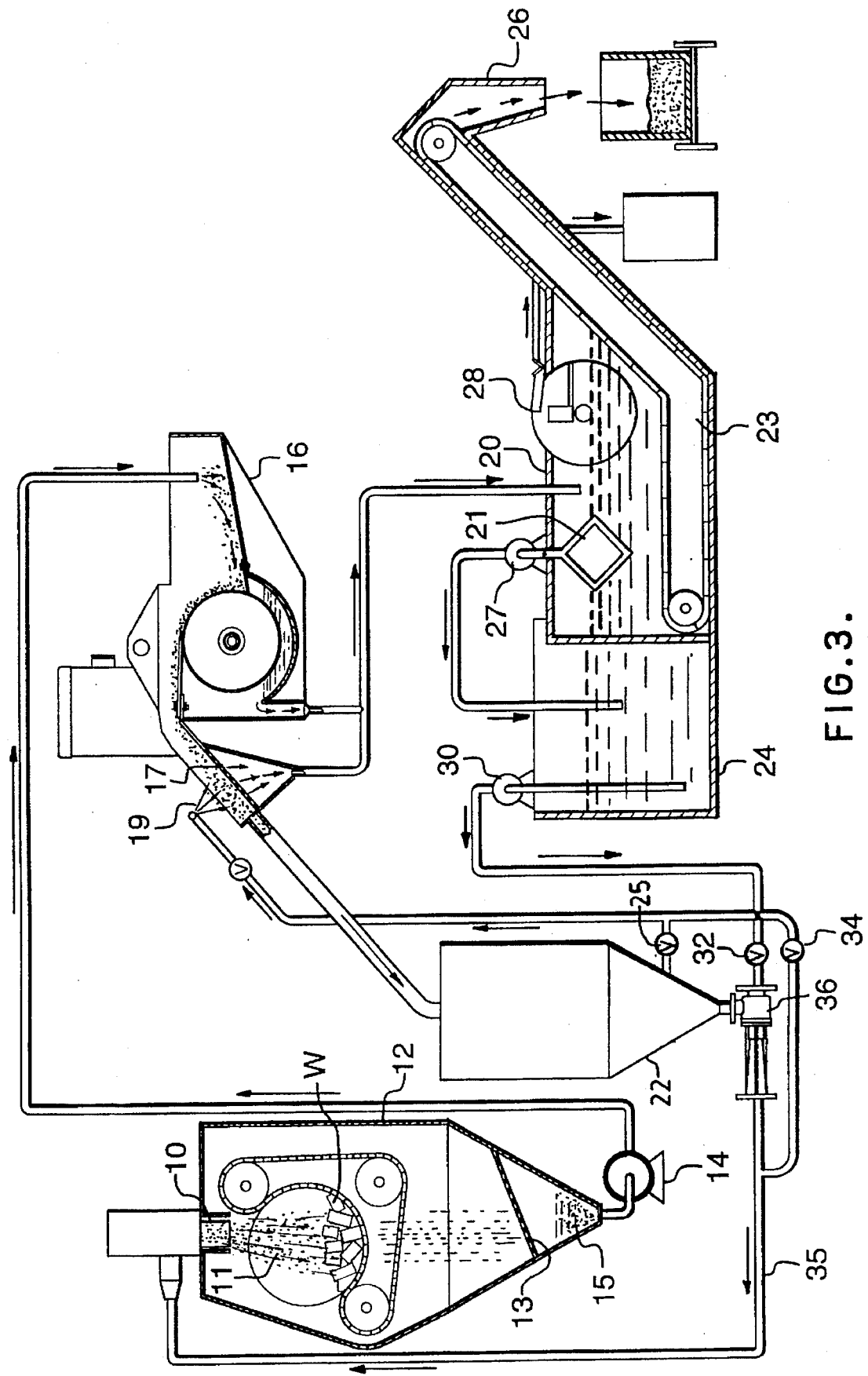
FIG. 3 is a diagrammatic side elevation view illustrating the method and apparatus of the present invention.
Figure 4:
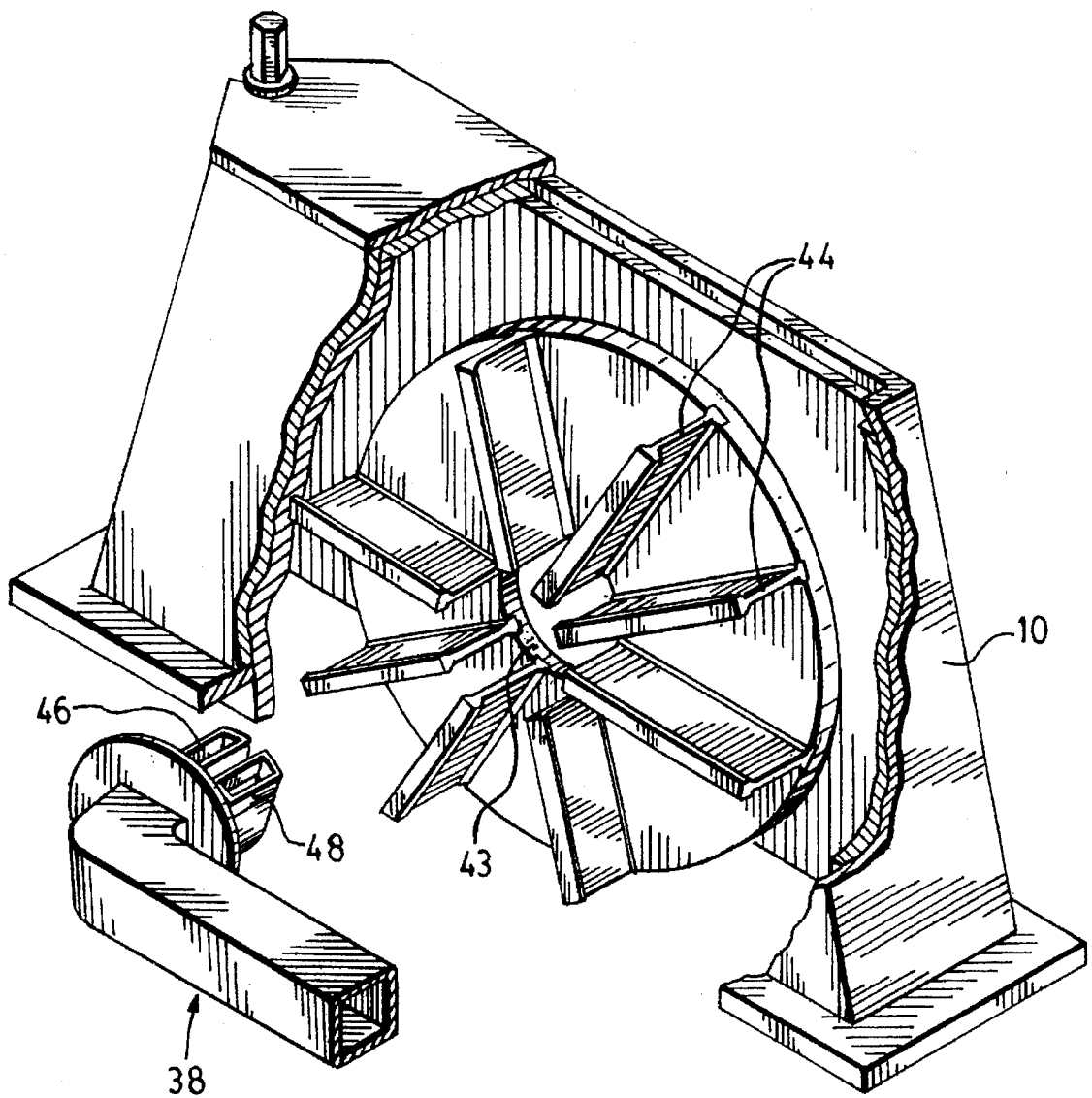
FIG. 4 is an exploded perspective view, partially cut away, of a slurry discharge head with vaned impeller and the nozzle of the present invention.
Figure 5:
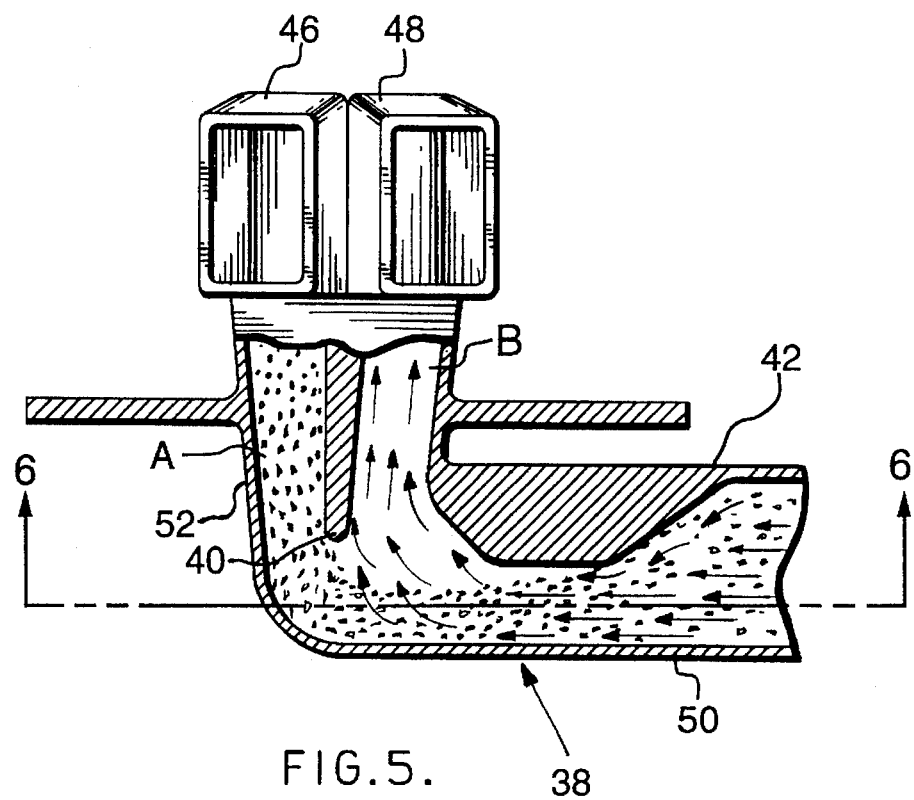
FIG. 5 is a partial cross-sectional top view of the nozzle of the present invention.
Figure 6:
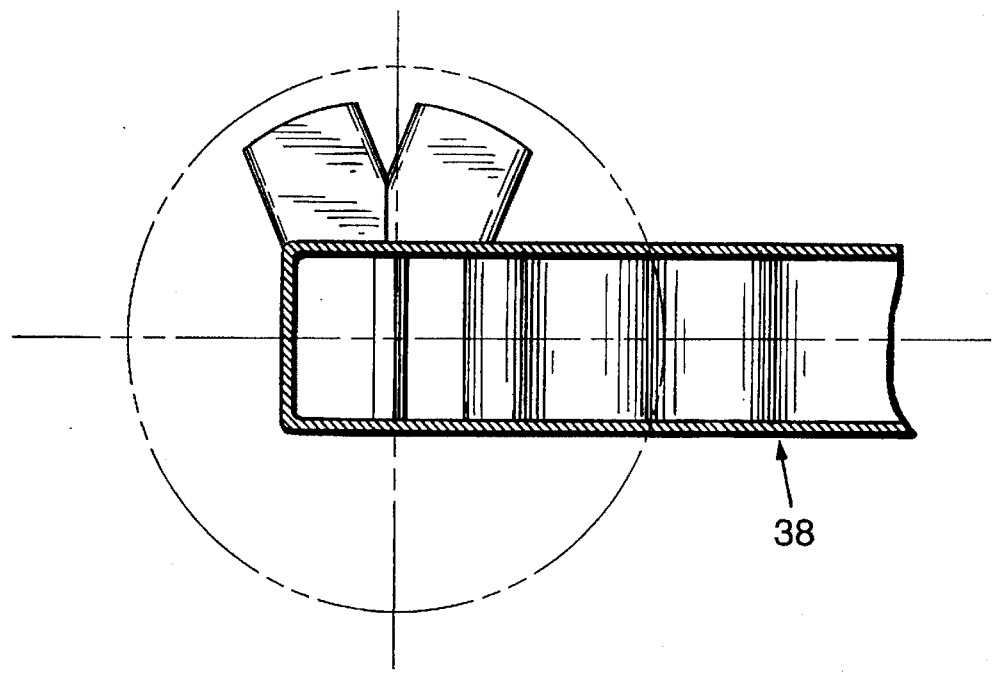
FIG. 6 is a longitudinal vertical section of the nozzle of the present invention taken along line 6—6 of FIG. 5.
Figure 7:
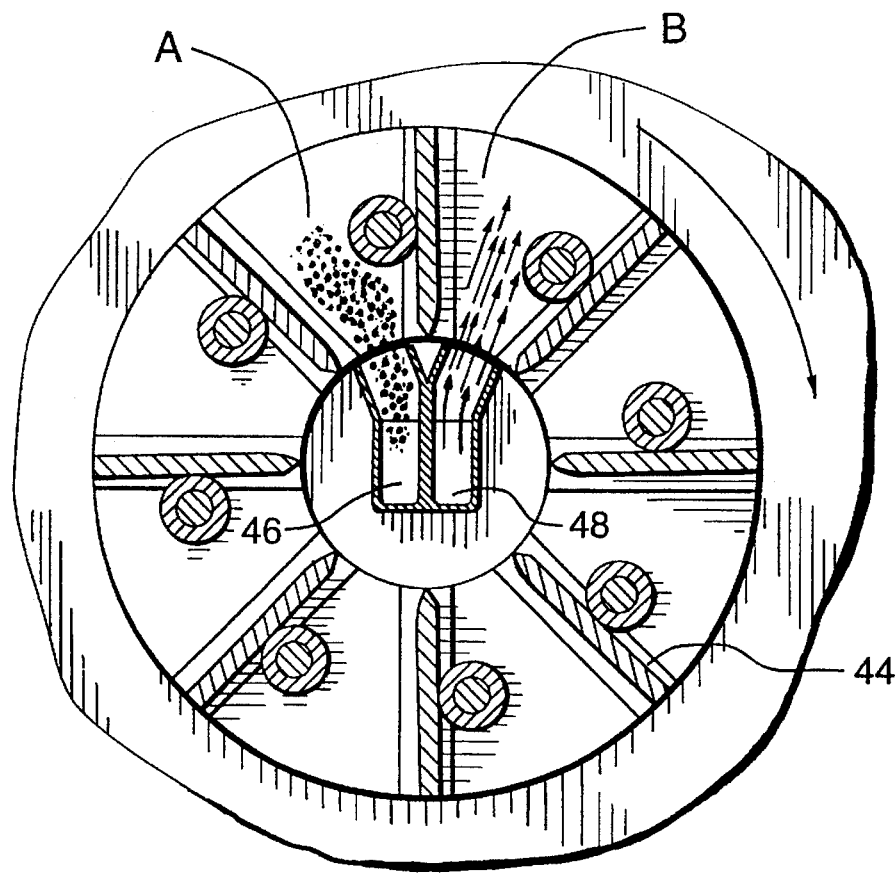
FIG. 7 is an end cross-sectional view of the slurry discharge head corresponding to FIG. 4 and the nozzle of the present invention.
Figure 8:
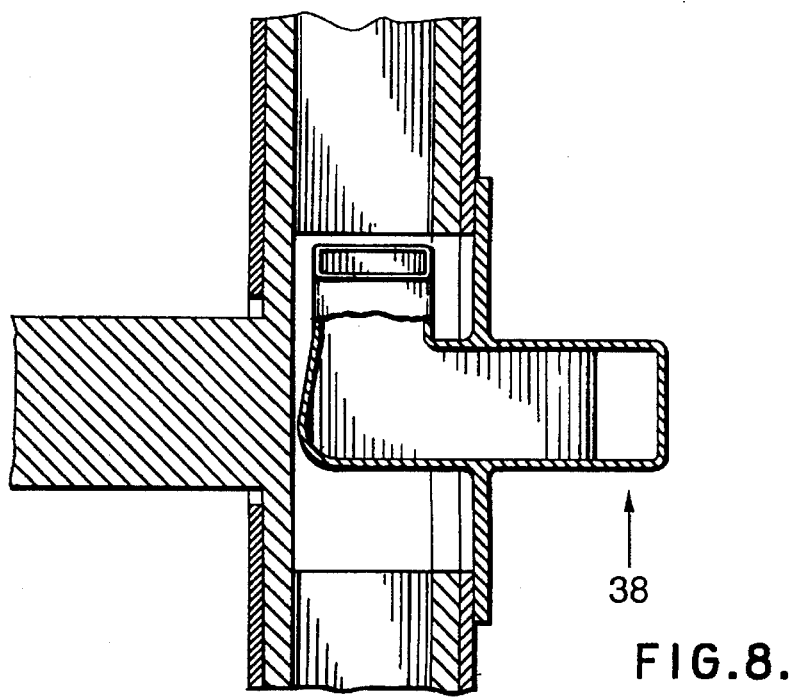
FIG. 8 is a vertical section of the nozzle of the present invention, partly in elevation, and the slurry discharge head.

Referring now to FIGS. 2 and 3, the method of the invention for shot blasting and washing or simultaneously chemically treating workpieces is shown in schematic form and diagrammatic form respectively and comprises subjecting workpieces W to be cleaned at high velocity cleaning by propelling slurry 11 from slurry discharge head 10 for impingement on the workpieces contained within blast cabinet 12. The slurry 11 comprises solid abrasive materials, preferably ferrous or aluminum shot or glass beads, and a carrier treatment liquid such as phosphate solution, dilute alkaline solution and the like solution, preferably an aqueous solution. Appropriate chemical agents can be introduced into the carrier liquid to cause the desired effect on the workpiece such as de-greasing, etching, phosphating, rust-inhibiting or waste treatment. In the preferred embodiment, the carrier liquid is water. The carrier liquid may be heated to enhance cleaning. The slurry discharge head 10 may comprise a discharge head such as that disclosed in U.S. Pat. No. 4,907,379, incorporated herein by reference.

In a preferred embodiment, a variable speed motor, not shown, powers the slurry discharge head 10 to enable the operator to vary the rate of rotation of the discharge head and the discharge velocity. In general, a slurry discharge velocity of between 150 and 350 feet per second (fps), preferably about 250 fps, is required during the cleaning process. The discharge slurry 11 has an elongated cone-like blast pattern (FIGS. 9 and 10) when discharged from slurry discharge head 10 at the workpiece. The shot, being heavier than the liquid, normally is discharged first from slurry discharge head 10 at velocities in the range of 150–350 fps at the workpiece. By varying the size of the shot pellet, the speed of the slurry discharge and/or the volume of shot discharged at the workpiece, the severity or degree of treatment may be controlled.

Blast cabinet 12 has a hopper bottom. A coarse refuse screen 13 placed at the lower end of the hopper prevents coarse debris from entering the slurry system. At the base of the hopper is return slurry pump 14 which pumps spent slurry 15 containing steel shot to magnetic primary separator 16 such as ERIEZ™ magnetic separators. Primary separator 16 magnetically separates the shot from the liquid and non-metallic waste. In a preferred embodiment, the separated metallic particles are then passed over screen 17 for shot wash/sizing 18. Screen 17 is interchangeable for selection of a desired shot size range. Clean liquid 19 washes the re-claimed shot as it runs over screen 17 and undersized shot and metallic particles are transported with the wash liquid to dirty liquid tank 20.

When glass beads are used as the abrasive, no magnetic separator is required.

The cleaned shot is transported to shot storage hopper 22. In the preferred embodiment, shot storage hopper 22 is a steeply shaped hopper to ensure proper flow of the shot to a discharge opening at the bottom of the hopper. A side mounted pipe connection 25 is attached to hopper 22 through which clean liquid is fed. This liquid assists in fluidizing the shot pellets for entrainment into the mixing valve 36. Any excess liquid passes through an overflow connection (not shown) on the hopper 22 and flows to dirty liquid tank 20. The wash liquid preferably includes a rust-inhibiter such as OAKITE™ INPRO-TECT 600™ to prevent any rusting and solidification of the shot while being stored.

The dirty liquid with non-metallic contaminants from primary separator 16 and wash liquid from shot wash sizing 18 which pass through screen 17 flow to dirty liquid tank 20 are filtered through filter 21 and pumped to clean liquid tank 24 for recycling of the liquid. Many different commercial filtration methods may be used. For example, liquid may be drawn from dirty liquid tank 20 to the clean liquid tank 24 by means of vacuum filtration through filter media 21 such as vacuum filters KALCON™ and HYDROFLOW™. Back-washable vacuum filters may also be used. Liquid is drawn by pump 27 through filter 21 into clean liquid tank 24. At a preset vacuum level, the filter is backwashed with clean liquid. This breaks loose the accumulated dirt on the filter which falls to the bottom of dirty liquid tank 20. The sludge which lays on the bottom of dirty liquid tank 20 is carried away by endless belt 23 to sludge discharge 26 which deposits the sludge into a waste bin.

Another method of filtration which may be utilized is gravity clarification in a settling tank. A dragout conveyor then removes the solids from the tank.

A paper filter method which utilizes a filter roll drive may also be used. In this method, filter media forms the bottom of dirty liquid tank 20 and the dirty liquid passes through the filter into clean liquid tank 24. As the dirt builds up on the filter, the rate at which the liquid passes through the filter decreases thereby causing a buildup of liquid in the dirty liquid hopper. As the level of liquid in the dirty liquid tank rises, it reaches a pre-set level at which a liquid level float device is actuated to index the filter roll drive and replace the dirty filter with a clean filter.

Oil and grease tend to float on the surface of dirty liquid tank 20. Various oil skimming devices shown as oil discharge 28 may be used to remove these contaminants. Depending on the volume of oil to be removed, either an oil wheel or an oil belt can be used. An oil wheel such as those known as THE OIL WHEEL™ has a vertical rotating disk partially immersed in the liquid. The floating oil is attracted to the disk and is carried to scraper plates which remove the oil and direct it to a waste container. Heavier off loading will require an oil belt such as that known as the SCROUNGER™ oil belt. The oil belt works similarly to the oil wheel in that oil attaches to the surface of the belt and is carried away from the tank by the belt. Scraper blades then remove the off from the belt and direct it to a waste bin.

After filtration, the operator then selects the direction of the flow of the liquid by selective actuation of blast valve 32 or wash valve 34. When blast valve 32 is closed, wash valve 34 is open for the wash or chemical treatment cycle and the clean liquid discharge from main pump 30 is passed directly to slurry discharge head 10 through line 35.

For the blast cycle, blast valve 32 is opened and wash valve 34 is closed. The discharge from main pump 30 will be directed through shot mixing valve 36 in line 33 in FIG. 1 to induct shot into the liquid. In the preferred embodiment, shot mixing valve 36 is an eductor valve, such as those known as the SCHUTTE KOEHRING™ eductor valve. Eductor valves such as the SCHUTTE KOEHRING™ valves are venturis which draw the shot from shot storage hopper 22 to mix with and be entrained by the liquid.

The process of the present invention avoids the need for caustics to remove paint and rust from a workpiece. Phosphating compounds in an aqueous solution interact with the metal surface of the workpiece thereby coating the surface. By introducing a phosphating agent in the carrier liquid into the shot blast process, the metal surface will be simultaneously cleaned and phosphated upon being activated by the shot. Oxides thus cannot form on the metal surface.

For steel components, a medium duty cleaning cycle (225–265 fps shot velocity) preferably 250 fps is required using a shot with an average size of 0.028" diameter. For aluminum castings, a light duty cleaning cycle (225–265 fps shot velocity) preferably 250 fps is preferred using a shot with average size of 0.017" diameter or a larger size shot may be used if the discharge head is running at reduced speed such as 175–225 fps preferably 200 fps.

It is desirable for efficiency of cleaning and to allow selective chemical treatment, either concurrently or sequentially of the workpiece, that the blast and wash patterns will target the same workpiece surface.

Nozzle or supply spout 38 of the invention, shown in FIGS. 4, 5, 6, 7 and 8, allows for a concurrently impelling abrasive particles and the carrier liquid at high velocity at a target area. Nozzle 38 has a first conduit feed section 50 disposed substantially parallel to slurry discharge head 10 and second conduit feed section 52 substantially perpendicular to first conduit feed section 50 and co-axial with slurry discharge head 10 terminating in outlets 46 and 48 which are substantially perpendicular to second conduit feed section 52. Deflector 42 encourages the shot to be deflected around the outer sections of first conduit feed section 50 and second conduit feed section 52. Divider 40 divides second conduit feed section 52 in two to enable further separation of shot A and liquid B. Due to differences in inertia and because of centrifugal force, shot A enters upstream outlet 46 and carrier liquid B enters downstream outlet 48. Shot A and liquid B are discharged onto vanes 44 of slurry discharge head 10 which increases the velocity of shot A and liquid B and propels shot A and liquid B at a target area.

As mentioned above, the shot is heavier than the carrier liquid and thus it will be discharged before the liquid and at a different discharge angle from a centrifugal discharge apparatus. By adjusting the position of outlets 46 and 48, the liquid and shot of the slurry may be discharged onto different vanes of the slurry discharge head 10.

Figure 9:
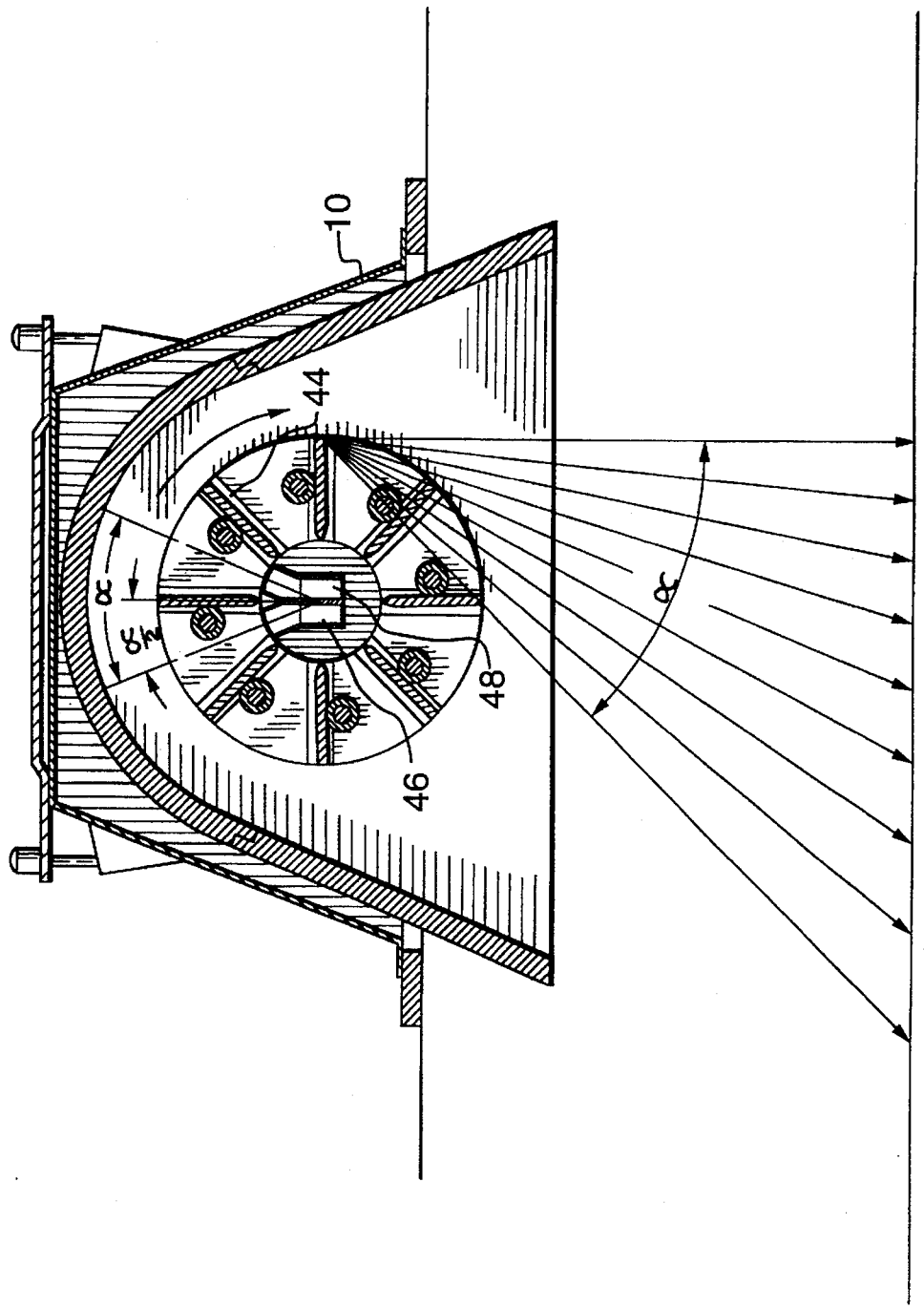
FIG. 9 is a cross-sectional side view of the slurry discharge head showing a blast pattern of the slurry.
Figure 10:
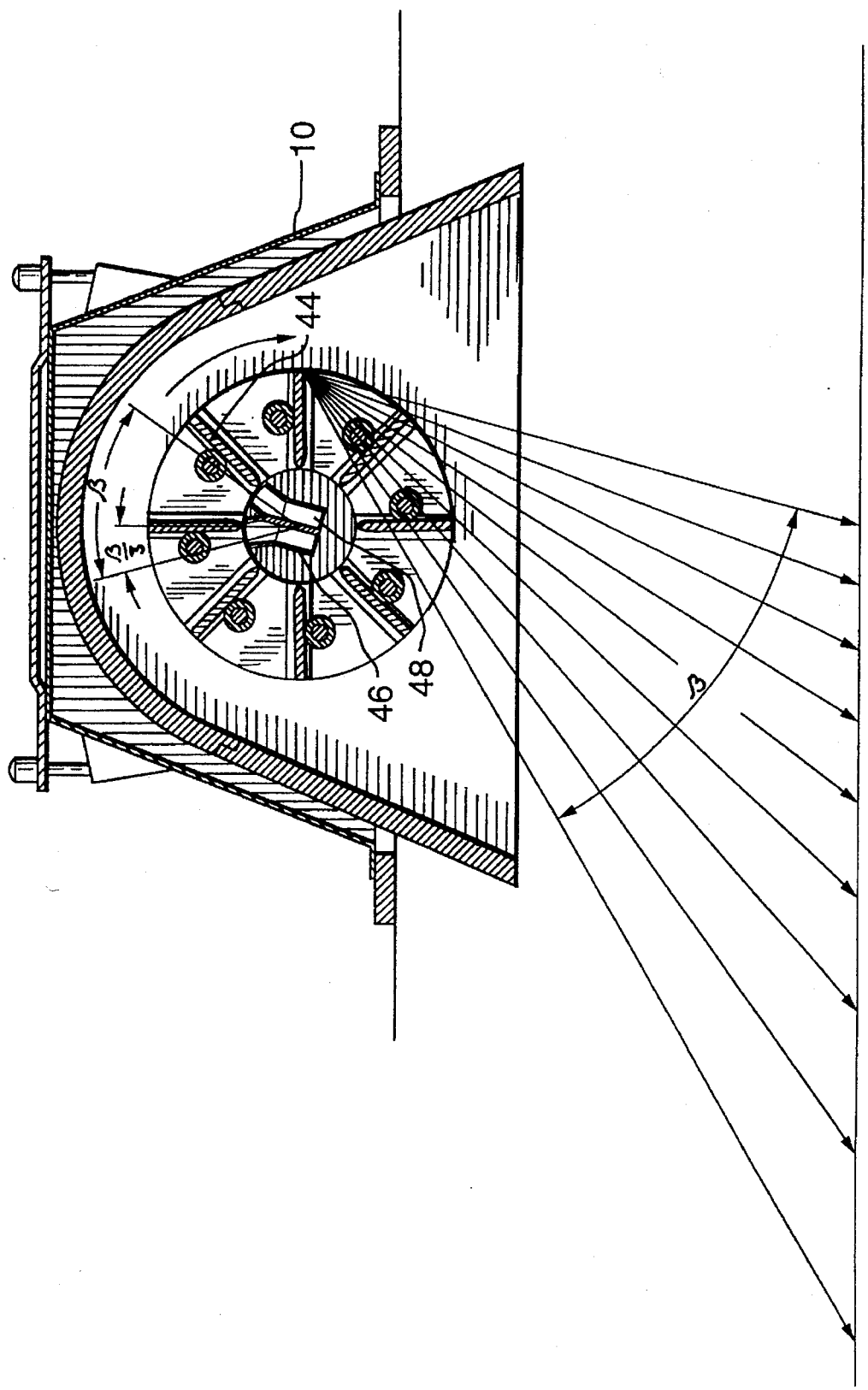
FIG. 10 is a cross-sectional side view of the slurry discharge head showing another blast pattern of the slurry.

As shown in FIGS. 4, 7, 9 and 10, the shot is dispensed furthest away from the discharge port of slurry discharge head 10. This compensates for the difference in mass between the shot and liquid to enable the shot and liquid to be discharged at substantially the same blast pattern on a workpiece. By varying the angle of the shot and liquid discharge, the blast pattern length and position is varied accordingly as shown in FIGS. 9 and 10.

Example

An aluminum cylinder head for a four-cylinder automotive engine was de-greased and cleaned using the above process and apparatus. A steel mesh tumble barrel of 36"× 18" diameter was constructed and the cylinder head was placed therein. The barrel was rotated by rollers powered by a chain. As the tumble barrel rotated, the slurry was shot from overhead. Approximately 250 pounds per minute of ferrous shot was propelled towards the cylinder head contained within the tumble barrel.

Ferrous shot of the size S170 (0.017" in diameter) was slurried in water heated to 140° F. The slurry discharge head blast wheel was 19½" in diameter and was rotated at 2300 revolutions per minute (rpm). Sixty gallons per minute of heated water was transmitted by the discharge head. A 25 h.p. electric motor with V-belt drive was used to actuate the blast wheel. An industrial cleaning agent and rust-inhibitor OAKITE™ INPRO-TECT 600™ was added in the amount of 1%–5% by volume, preferably 3% by volume, to the water.

After operation for approximately two minutes with a 36" long blast pattern, the cylinder head was de-greased and cleaned.

It will be understood that modifications can be made in the embodiment of the invention described herein without departing from the scope and purview of the invention as defined by the appended claims.

I claim:

1. A method of shot blast cleaning a workpiece comprising the steps of:

applying a composite stream of carrier liquid and particulate abrasive material under high velocity to said workpiece contained within a blast cabinet for cleaning said workpiece by an abrasive throwing wheel having a vaned impeller rotatably mounted within a casing for receiving an abrasive slurry at a relatively low velocity and discharging said slurry at a relatively high velocity out through said open side, supplying the abrasive slurry to the vaned impeller radially onto the impeller at the centre thereof from a supply spout, said supply spout having a first conduit feed section disposed parallel to the impeller, a second conduit section perpendicular to the first conduit feed section and co-axial with the impeller terminating in a pair of spaced-apart radially directed outlets perpendicular to the second conduit section, whereby abrasive particles in the slurry are deflected by centrifugal force into an upstream outlet and the liquid deflected into a downstream outlet onto the impeller for discharge therefrom;

transporting spent composite stream after cleaning to an abrasive material separator for separating said abrasive material from the carrier liquid and for removing undersized abrasive material to produce sized abrasive material;

storing said sized abrasive material in a storage feed tank in communication with a shot mixing valve;

cleaning said carrier liquid for reuse of said carrier liquid; and pumping the cleaned carrier liquid under pressure through the shot mixing valve for inducing abrasive material into said liquid and applying said carrier liquid and said abrasive material as separate streams concurrently from the upstream outlet and from the downstream outlet of the throwing wheel onto the workpiece contained within said blast cabinet in a substantially overlapping blast pattern.

2. A method as claimed in claim 1 which additionally comprises the step of applying the carrier liquid to the workpiece for washing the workpiece.

3. A method as claimed in claim 1 in which said carrier liquid is selected from the group consisting of phosphating, de-greasing, etching, rust-inhibiting or waste treatment solutions.

4. A method as claimed in claim 1 in which said carrier liquid is water.

5. A method as claimed in claim 1 in which said abrasive material is selected from the group consisting of aluminum or steel shot.

6. A method as claimed in claim 1 in which said abrasive material separator is a magnetic separator.

7. A method as claimed in claim 1 in which said abrasive material is glass beads.

8. A method as claimed in claim 1 in which said carrier liquid is heated.

9. A liquid-abrasive blast cleaner apparatus for concurrently impelling particulate abrasive material and a carrier liquid at high velocity at a target area comprising: a substantially semi-cylindrical casing having an open side, an abrasive throwing wheel having a vaned impeller rotatably mounted within the casing for receiving an abrasive slurry at a relatively low velocity and discharging said slurry at a relatively high velocity out through said open side, a supply spout for supplying the abrasive slurry to the vaned impeller radially onto the impeller in proximity to the centre thereof, said supply spout having a first conduit feed section disposed substantially parallel to the impeller, a second conduit section perpendicular to the first conduit feed section and co-axial with the impeller terminating in a pair of spaced-apart radially directed outlets substantially perpendicular to the second conduit section whereby abrasive particles in the slurry are deflected by inertial force into an upstream outlet and the liquid deflected into a downstream outlet for discharge of the slurry onto the vaned impeller in separate streams whereby the abrasive particles and liquid streams are consolidated into an overlapping blast pattern.

10. A liquid-abrasive blast cleaner apparatus as claimed in claim 9 in which said first conduit feed section contains a deflector for deflecting said abrasive material in the direction of said upstream outlet as said abrasive material travels within said conduit.

* * * * *